Sept. 27, 1960 J. W. HASKELL 2,954,530
DIRECT CURRENT TRANSISTOR AMPLIFIER
Filed July 3, 1958
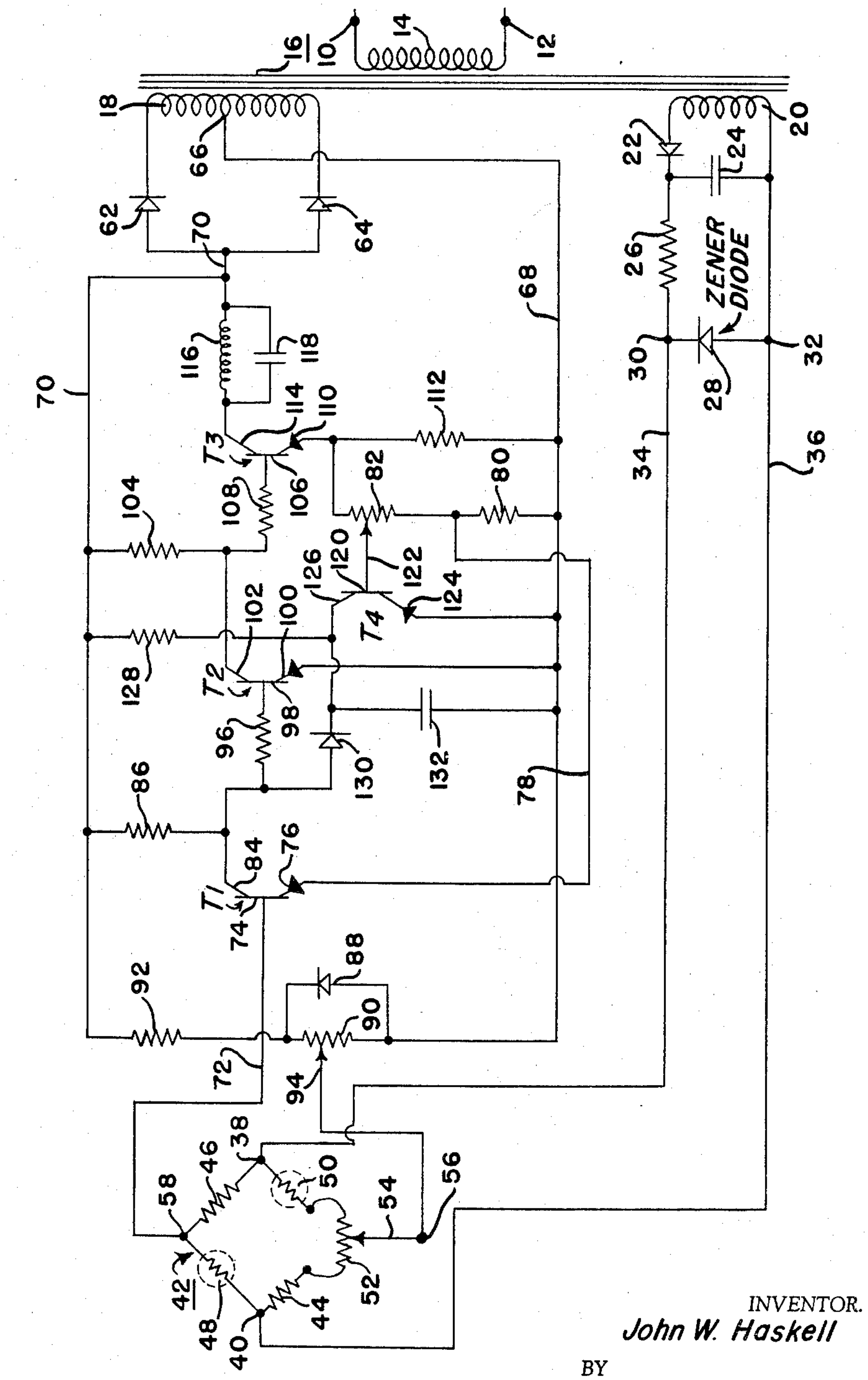
INVENTOR.
John W. Haskell
BY
G. H. Strickland
His Attorney United States Patent Office 2,954,530

Patented Sept. 27, 1960

2,954,530

DIRECT CURRENT TRANSISTOR AMPLIFIER

John W. Haskell, Rochester, N.Y., assignor to General Motors Corporation, Detroit, Mich., a corporation of Delaware Filed July 3, 1958, Ser. No. 746,436

12 Claims. (Cl. 330—19)

This invention relates to amplifiers and particularly to direct current transistor amplifiers.

Heretofore, it has been proposed to utilize a magnetic amplifier circuit arrangement for modulating type automatic temperature control systems, one such system being disclosed in copending application Serial No. 662,468 filed May 29, 1957, in the name of Andires C. de Wilde and assigned to the assignee of this invention. However, magnetic amplifiers are expensive and, in addition, are unstable with variations in line voltage. The present invention relates to a relatively inexpensive transistor amplifier for a modulating type temperature control system which has substantially stable gain characteristics irrespective of line voltage variations. Accordingly, among my objects are the provision of a direct current transistor amplifier having stable gain characteristics with variations in supply voltage; the further provision of a transistor amplifier including negative feedback circuit and a regulated bias circuit for the input amplifier stage; the further provision of a transistor amplifier including means for cutting off the amplifier output at a selected output level; and the still further provision of a transistor amplifier including a positive feedback circuit and a diode switch for controlling the on-off characteristics of the amplifier.

The aforementioned and other objects are accomplished in the present invention by utilizing a three stage amplifier wherein the negative feedback circuit is connected to all of the amplifier stages, and the positive feedback circuit is connected to only the last two stages. Specifically, the amplifier includes three cascade connected stages, all of which include transistors operated in the common emitter connection. The input signal is derived from a thermistor bridge which is energized from a substantially constant voltage direct current source. A direct current signal is developed across the output terminals of the thermistor bridge when the controlled temperature differs from the temperature setting thereof. This direct current signal has one polarity when the controlled temperature is below the temperature setting of the thermistor bridge, and an opposite polarity when the controlled temperature is above the temperature setting of the thermistor bridge.

The input signal from the thermistor bridge is applied to the base of the input stage transistor by a direct coupling. The regulated base current bias for the first stage transistor is derived from a diode conducting in the forward direction, which diode is shunted by a potentiometer whereby the base current bias can be adjusted. The output from the collector circuit of the first transistor is applied through a resistor coupling to the base of the second stage transistor, and the output of the second transistor is applied to the base of the third stage transistor through a resistor coupling. The output load is connected in series with the collector of the third transistor. The power supply for the amplifier is full wave rectified, unfiltered and unregulated direct current voltage, the potential of which varies with variations in line voltage.

In order to stabilize the overall amplifier gain during variations in line voltage, the three amplifier stages are connected to a negative feedback circuit. The negative feedback circuit includes a voltage divider network in the emitter circuit of the output stage transistor, there being sufficient impedance in the emitter circuit of the output stage transistor to provide the necessary feedback signal. The emitter of the first transistor is connected to the voltage divider network, and, in combination with regulation of the base current bias in the input stage, the amplification of the input signal remains substantially stable irrespective of variations in the line voltage.

The positive feedback circuit includes a fourth transistor operated in the common emitter connection. The feed-back signal is derived from the voltage divider network in the emitter circuit of the output stage transistor and the positive feedback signal is amplified by the fourth transistor. Thus, the base of the fourth transistor is connected to a slider of a potentiometer in the voltage divider network while the collector of the fourth transistor is connected to the collector of the input stage transistor through a diode switch. The diode switch is back biased when the collector voltage of the first transistor exceeds the collector voltage of the fourth transistor, which condition will exist as long as the amplifier output exceeds a preselected level. However, as the amplitude of the input signal to the first stage of the amplifier decreases, the level of amplifier output decreases so that at a preselected level of amplifier output the switch diode will be forwardly biased and thereby cut off the amplifier output.

The amplifier output will remain cut off until the amplitude of the input signal to the first stage of the amplifier increases so that the diode switch will be returned to a back biased condition. The switching action takes place rapidly, the speed of the switching action being determined by a capacitor which shunts the fourth transistor.

Further objects and advantages of the present invention will be apparent from the following description, reference being had to the accompanying drawing, wherein the figure is a schematic diagram of a preferred embodiment of the amplifying arrangement of the present invention.

Referring to the drawing, unregulated alternating current voltage is supplied to terminals 10 and 12 of the primary winding 14 of a transformer 16. The alternating current line voltage supplied to the primary winding 14 normally varies between 90 volts and 130 volts. The transformer 16 includes two secondary windings 18 and 20. The nominal alternating current voltage across secondary winding 18 may be on the order of 30 volts and the nominal alternating current voltage across secondary winding 20 may be on the order of 15 volts. One end of the secondary winding 20 is connected to a half wave rectifier 22, the rectifier and the other side of the secondary winding 20 being shunted by a capacitor 24 which filters the half wave rectified voltage. A resistor 26 and a Zener diode 28 are connected across the half wave rectified power supply, the Zener diode constituting a voltage regulator whereby a substantially constant voltage of five volts is maintained across terminals 30 and 32 thereof. The characteristics of the Zener diode are well known and suffice it to say that the Zener diode has a backward firing voltage which remains substantially constant during variations in line voltage.

Terminals 30 and 32 of the Zener diode are connected to wires 34 and 36 respectively, the wires 34 and 36 connecting with input terminals 38 and 40, respectively, of a thermistor bridge 42. The thermistor bridge 42 includes fixed resistors 44 and 46 in opposed legs thereof and thermistors 48 and 50 having negative temperature coefficients in the other two opposed legs thereof. The legs containing resistor 44 and thermistor 50 are connected by a potentiometer 52 having a movable slider 54 which is used to balance the thermistor bridge at the selected temperature. The slider 54 is connected to one output terminal 56 of the thermistor bridge, and the junction between thermistor 48 and the resistor 46 constitutes the other output terminal 58 of the thermistor bridge.

When the controlled temperature is equal to the setting of the thermistor bridge, the thermistor bridge is balanced and there is no potential difference between the output terminals 56 and 58. However, when the controlled temperature differs from the temperature setting of the thermistor bridge, the bridge is unbalanced and accordingly there is a potential difference between the output terminals 56 and 58 so that the thermistor bridge will produce an output signal. The output signal will have one polarity when the controlled temperature is below the temperature setting of the thermistor bridge, and an opposite polarity when the controlled temperature is above the setting of the thermistor bridge. The amplifier, to be described, responds only to an output signal from the thermistor bridge when the bridge is unbalanced by reason of the controlled temperature being less than the temperature setting of the thermistor bridge.

The power supply for the transistor amplifier is derived from the secondary winding 18, opposite ends of which are connected to rectifiers 62 and 64. The secondary winding 18 is center tapped at 66, with the center tap being connected to conductor 68. Accordingly, full wave rectified unregulated, unfiltered direct current voltage is supplied by the conductors 68 and 70. The transistor amplifier includes four transistors, T1, T2, T3 and T4 of the p-n-p type. The transistor T1 is in the input stage, the transistor T2 is in the second stage, the transistor T3 is in the output stage, and the transistor T4 is in the positive feedback circuit. The input signal of the transistor T1 is derived from the thermistor bridge 42, the output terminal 58 of the thermistor bridge being connected by wire 72 to the base 74 of the transistor T1. The transistor T1 is operated in the common emitter connection, the emitter 76 being connected by wire 78 between resistor 80 and a potentiometer 82 of a voltage divider network across which the feedback signals are developed. The collector 84 of the transistor T1 is connected to the direct current power supply conductor 70 through a load resistor 86. The base current bias for the transistor T1 is driven from a Germanium diode 88 conducting in the forward direction, the diode 88 being shunted by a potentiometer 90. One end of the potentiometer 90 is connected to the wire 68, the other end of the potentiometer is connected through a resistor 92 to the wire 70. The slider 94 of the potentiometer 90 is connected to the output terminal 56 of the thermistor bridge. The base current bias can be adjusted by movement of the slider 94, while the potential difference across the end of the potentiometer 90 remains substantially constant with variations in supply voltage due to the operating characteristics of the diode 88. Thus, the diode 88 maintains a substantially constant forward voltage drop across the potentiometer 90 so as to maintain a substantially constant source of base current bias for the transistor T1 irrespective of variations in the line voltage supplied to the primary winding 14 of the transformer 16.

The input signal derived from the thermistor bridge 42 and amplified by the transistor T1 is applied through resistor 96 to the base 98 of a transistor T2 which is also operated in the common emitter connection. The collector 102 of transistor T2 is connected to the wire 70 through a load resistor 104. The amplified output signal at the collector circuit of the transistor T2 is applied to the base 106 of the transistor T3 through a resistor 108, which is also operated in the common emitter connection. The emitter 110 of the transistor T3 is connected through a resistor 112 to the conductor 68, the resistor 112 maintaining a sufficient impedance in the emitter circuit of transistor T3 so that a feedback signal will be developed across the voltage divider network comprising resistor 80 and potentiometer 82 which shunts the resistor 112. The collector 114 of the transistor T3 is connected to the conductor 70 through an output load 116 which may comprise a solenoid for operating a gas valve of a furnace. The solenoid 116 is shunted by a capacitor 118 to increase the output power of the amplifier.

The over-all gain of the amplifier is stabilized during variations in line voltage by a negative feedback circuit including the voltage divider network comprising the resistor 80 and the potentiometer 82 in the emitter circuit of the output stage. In addition, regulation of the base current bias of the base 74 of the input stage transistor assists in stabilizing the over-all gain of the amplifier. Negative feedback signals are applied to all three stages of the amplifier by virtue of the emitter 76 of the input stage being connected by wire 78 to the resistor 80 and potentiometer 82 of the voltage divider network.

This positive feedback circuit includes transistor T4 which is also operated in the common emitter connection. The base 120 of the transistor T4 is connected to the slider 122 of the potentiometer 82. The emitter 124 is connected to the wire 68, and the collector 126 is connected through load resistor 128 to the wire 70. In addition, the collector 126 of the transistor T4 is connected to the collector 84 of the transistor T1 through a germanium diode 130. A capacitor 132 is connected between the collector 126 of the transistor T4 and the conductor 68 and effectively shunts the transistor T4. The slider 122 is adjusted to determine the level of the output sginal at which the amplifier will be cut off. The switch-off point is adjustable from ten percent of the output up to one hundred percent of the amplifier output. However, the amplifier is designed so that it will only switch on with full output.

Assuming that the slider 122 is adjusted to switch off the amplifier when the output signal is forty percent of full output, operation of the positive feedback circuit is as follows. When the level of the output signal is above forty percent of the maximum output signal the base to emitter voltage on the transistor T4 is sufficiently high so that the base current of transistor T4 completely saturates the transistor T4 whereby the voltage on the collector 126 of the transistor T4 is lower than the voltage on the collector 84 of the transistor T1. Since the collectors 84 and 126 are connected by the diode switch 130, when the collector voltage of the transistor T1 exceeds the collector voltage of the transistor T4, the diode 130 is back biased so that the positive feedback circuit is essentially disconnected. As the output signal is reduced to forty percent, or the setting of the slider 122 of the potentiometer 82, the amplitude input signal of the thermistor bridge 42 is decreasing, and accordingly, the voltage at the collector 84 rises at a slow rate. This causes the emitter current in the emitter circuit of the output transistor T3 to decrease thereby decreasing the base to emitter voltage of transistor T4. Accordingly, the voltage of the collector 126 and the transistor T4 rises at a much faster rate than the increase in the voltage at the collector at the transistor T1. When the voltage at the collector 126 exceeds the voltage at the collector 84, the switching diode 130 will be forward biased, so as to increase the voltage on the collector 84 of the transistor T1 and cut off the amplifier.

Conversely, as the input signal to the transistor T1 increases due to the controlled temperature being less than the temperature setting of the thermistor bridge, the input current saturates the transistor T1 so as to reduce the voltage on the collector 84. When the voltage on the collector 84 is sufficiently reduced, some of the positive feedback base current supplied to the second stage transistor T2 from the positive feedback circuit will be diveretd so as to reverse the bias on the switching diode and cut on the amplifier with a maximum output. The switching speed of the diode 130 is determined by the capacitor 132, the capacitor 132 also acting as a filter for smoothing out the ripple voltage supplied to the collector of the transistor T4.

Operation of the temperature control system is as follows. When the controlled temperature equals the temperature setting of the thermistor bridge 42, no input signal is supplied to the amplifier, and hence the amplifier remains cut off. As the controlled temperature decreases below the setting of the thermistor bridge, an input signal of increasing amplitude is supplied to the input stage of the amplifier. When the amplitude of the input signal is sufficient to saturate the transistor T1, some of the base current supplied to the transistor T2 from the transistor T4 will be diverted so as to reverse the bias on the diode 130 whereupon the voltage at the collector 84 will exceed the voltage at the collector 126. Accordingly, the amplifier will be switched on at full output level so that the valve operated by solenoid 116 will be fully opened.

As the controlled temperature increases, the amplitude of the input signal derived from the thermistor bridge 42 decreases thereby resulting in a reduction in the level of the amplifier output. When the amplifier output is reduced to the level preselected by the position of the slider 122 of the potentiometer 82, the diode 130 will be forward biased so as to cut off the amplifier. The negative feedback circuit and the regulation of the base current bias for the input transistor T1 maintains the overall gain of the amplifier substantially constant during variations in line voltage.

While the embodiment of the invention as herein disclosed constitutes a preferred form, it is to be understood that other forms might be adopted.

What is claimed is as follows:

1. A direct current amplifier circuit arrangement including, first, second and third transistors each having a base, a collector and an emitter, means for impressing an input signal on the base of the first transistor, means for deriving an output signal from the collector of the first transistor, means for impressing the output signal of the first transistor on the base of the second transistor, means for deriving an output signal from the collector of the second transistor, means for connecting the collector of the second transistor to the base of the third transistor, means for deriving an output signal from the collector of the third transistor, a voltage divider network connected in the emitter circuit of the third transistor, means for impressing a negative feedback signal from said voltage divider on the emitter of the first transistor, a source of unregulated direct current voltage for supplying biasing potentials to said transistors, and means connected across said source for deriving a substantially constant source of base current bias for the first transistor whereby the overall gain of said amplifier will be stabilized with variations in the voltage of said direct current voltage source, said last recited means comprising a voltage divider network including a plurality of resistors connected across said source of direct current voltage and a forward conducting diode shunting one of said resistors, said forward conducting diode maintaining a substantially constant voltage drop across said one resistor during variations in the voltage of said source.

2. The amplifier circuit arrangement set forth in claim 1 wherein said one resistor comprises a potentiometer, and wherein said amplifier circuit arrangement includes an input signal source having a pair of output terminals, one of said output terminals being directly coupled to the base of said first transistor, and the other of said terminals being connected to the slider of said potentiometer whereby the base current bias of said first transistor can be adjusted by movement of said slider.

3. An amplifier circuit including a plurality of cascade connected transistor amplifier stages, each stage including a transistor having base, emitter and collector electrodes, energizing means including a source of unregulated potential for applying biasing potentials to said electrodes, and a base current bias circuit for the base electrode of the first stage transistor including a voltage divider network connected across said source of potential and a forward conducting diode, said voltage divider network comprising a plurality of resistors, said diode shunting one of said resistors so as to maintain a substantially constant voltage drop thereacross during variations in the potential of said source to thereby stabilize the gain of said amplifier circuit.

4. A direct current amplifier circuit arrangement including, first, second and third transistors each having a base, a collector and an emitter, means for impressing an input signal on the base of the first transistor, said transistors having direct couplings whereby an amplified output signal is developed in the collector circuit of the third transistor, a voltage divider network in the emitter circuit of the third transistor across which feedback signals are developed, a direct current power source, a fourth transistor having a base, a collector and an emitter, the emitter of the fourth transistor being connected to said power source, means connecting the base of the fourth transistor to said voltage divider network, and means interconnecting the collectors of the first and fourth transistors, including a switching diode, said switching diode being back biased when the level of the output signal in the collector circuit of the third transistor exceeds a predetermined value and being forward biased when the level of the output signal in the collector circuit of the third transistor is less than said predetermined value whereby said fourth transistor controls the operation of the amplifying circuit arrangement.

5. An amplifier circuit including three cascade connected transistor amplifier stages, each stage including a transistor having a base, an emitter and a collector, a direct current power source, a positive feedback circuit between the collector of the first stage and the emitter of the third stage, said positive feedback circuit including a diode and a fourth transistor having a base, an emitter and a collector, said diode being connected between the collector of the first transistor and the collector of the fourth transistor, the base of the fourth transistor being connected to the emitter of the third stage transistor, the emitter of the fourth transistor being connected to said power source, and means biasing said diode to prevent conduction therethrough as long as the level of the output from the amplifier circuit is more than a predetermined value, said diode permitting conduction therethrough when the level of the output from the amplifier circuit is less than said predetermined value to thereby cut off the amplifier circuit.

6. An amplifier circuit including three cascade connected transistor amplifier stages, each stage including a transistor having base, emitter and collector electrodes, energizing means connected for biasing said electrodes, means for applying a signal from the emitter circuit of the last stage to the base electrode of the second stage including a gated feedback circuit, said gated feedback circuit comprising a unidirectional current element, and an output circuit coupled to the collector electrode of the last stage, said gated feedback circuit being operable to cut off the amplifier circuit when the level of the output from the amplifier circuit is less than a predetermined value.

7. The amplifier circuit arrangement set forth in claim 6 wherein said unidirectional current element comprises a diode.

8. The amplifier circuit arrangement set forth in claim 6 wherein said gated feedback circuit includes a voltage divider network in the emitter circuit of the last stage transistor, and a fourth transistor having base, emitter and collector electrodes, means directly coupling the base electrode of said fourth transistor to said voltage divider network, and means connecting the collector of the first transistor stage to the collector of said fourth transistor through said unidirectional current element.

9. The amplifier circuit set forth in claim 8 wherein said voltage divider network includes a plurality of resistors, one of said resistors being a potentiometer, and wherein the base electrode of said fourth transistor is connected to the slider of said potentiometer, said slider being adjustable to determine the level of the output at which the amplifier circuit will be cut off.

10. An amplifier circuit including three cascade connected transistor amplifier stages, each stage including a transistor having base, emitter and collector electrodes, an input signal source of variable amplitude, means for impressing the input signal on the base electrode of the first transistor, a positive feedback circuit between the emitter electrode of the third stage transistor and the base electrode of the second stage transistor including a switching diode and a fourth transistor having base, emitter and collector electrodes, a source of unregulated potential for applying bias potentials to said electrodes, means connecting the emitter electrode of the fourth transistor to said source of unregulated potential, means connecting the emitter of the fourth transistor to the emitter electrode of the third stage transistor, the collector of the fourth transistor being connected to one side of said switching diode, and means for adjusting the amplitudes of the signal in said positive feedback circuit whereby said fourth transistor and diode will cut off said amplifier circuit when the level of the output from said amplifier circuit is less than a predetermined value, said amplifier circuit becoming operative when the amplitude of the input signal is sufficient to divert base current from the second stage transistor as supplied by said feedback circuit.

11. The amplifier circuit set forth in claim 10 wherein said positive feedback signal is derived from a voltage divider network in the emitter circuit of the third stage transistor.

12. The amplifier circuit set forth in claim 11 wherein the emitter electrode of the first stage transistor is connected to said voltage divider network whereby said voltage divider network is utilized to provide a negative feedback signal to stabilize the gain of said amplifier circuit with variations in the potential of said source.

References Cited in the file of this patent

UNITED STATES PATENTS

| | | |
|---|---|---|
| 2,538,488 | Volkers | Jan. 16, 1951 |
| 2,761,916 | Barton | Sept. 4, 1956 |
| 2,819,399 | Teltscher | Jan. 7, 1958 |

FOREIGN PATENTS

| | | |
|---|---|---|
| 164,807 | Australia | Aug. 25, 1955 |

OTHER REFERENCES

Publication: Radio and Television News, vol. 56, No. 5, pages 44–46, November 1956, Combination Preamplifier and Power Amplifier, by Lowry.